United States Patent Office 3,184,514
Patented May 18, 1965

3,184,514
MANUFACTURE OF TRANS-1,2-DIHALOGENOETHYLENES
Kurt Sennewald, Knapsack, near Cologne, and Klaus Born, Hermulheim, Germany, assignors to Knapsack-Griesheim Aktiengesellschaft, Knapsack, near Cologne, Germany, a corporation of Germany
No Drawing. Filed Jan. 31, 1961, Ser. No. 86,002
Claims priority, application Germany, Apr. 22, 1958, K 34,660
11 Claims. (Cl. 260—654)

The present invention is a continuation-in-part of our application Serial No. 806,207, filed April 14, 1959, now abandoned, and relates to a process for making trans-1,2-dihalogenoethylenes, for example trans-1,2-dichloroethylene, or also substituted 1,2-dihalogenoethylenes.

The manufacture of 1,2-dihalogenoethylenes from acetylene and hydrohalic acid in the presence of a copper halide catalyst has repeatedly been described in the pertinent literature. This method involves various advantages as compared, for example, with the direct chlorination of acetylene, and is especially interesting since it uses hydrochloric acid as the chlorine-yielding component instead of free chlorine.

The reaction is based on the fact that acetylene reacts with an acid $Cu^{II}Cl_2$-solution in the presence of $Cu^I_2Cl_2$ to be transformed into dichloroethylene, the $Cu^{II}Cl_2$ being reduced to $Cu^I_2Cl_2$. The catalyst solution is regenerated in a hydrochloric acid solution by means of oxygen or a gas containing oxygen.

All catalyst solutions heretofore used do not yield, however, satisfactory results. Some of them have too poor an activity and are therefore uneconomical, while others have a satisfactory activity but imply technical difficulties. Solutions which produce about 100 grams of trans-1,2-dichloroethylene per liter of catalyst solution an hour, crystallize strongly at room temperature; the salts can be kept in solution only at a raised temperature. The reaction with acetylene further increases the readiness of these catalysts to crystallize and the apparatus essential for the reaction, especially the catalyst supply line and the acetylene inlets in the reaction tower, become clogged in most cases after a few hours of reaction operation.

It has also been ascertained that trans-1,2-dichloroethylene prepared in known manner is contaminated by an organic compound of intense and unpleasant odor. The dichloroethylene is very difficult to purify in view of the fact that the usual purification processes, for example rectifying distillation or treatment with active carbon or a similar treatment, do not provide the desired result. Nor can these annoying impurities be removed when 1,2-dichloroethylene has been made into 1,1,2-trichloroethylene. As a matter of fact, the aforesaid impurity considerably impairs not only the quality of 1,2,-dichloroethylene but also the quality of 1,1,2-trichloroethylene which is produced on an industrial scale.

Now, we have found that the aforesaid difficulties involved in all known catalyst compositions disappear when the copper chloride dissolved, for example, in hydrochloric acid is admixed with certain readily water-soluble salts which are capable, inter alia, of forming complex compounds with $Cu^I_2Cl_2$, for example $CaCl_2$ or $LiCl_2$. We have also found that calcium halide, for example a $CaCl_2$ solution, enables catalysts of considerably increased activity to be prepared which can be used without difficulty.

The present process distinguishes over U.S. Patents 2,809,221 (Thomas et al.) and 2,915,565 (Jacobowsky et al.) which involve processes in the same field of operation as the present invention.

U.S. Patent 2,809,221 to Thomas et al. has as its subject the selective chlorination of an acetylene-ethylene-mixture, whereby 1,2-dichloroethylene accumulates as by-product and the obtaining of possibly pure ethylene is suggested. The patentees have not seen what importance the contact composition can have on the process in view of the yield of 1,2-dichloroethylene and its purity. The contact compositions described in the examples of Thomas differ from the present process in the added total salt quantities and in the $Cu^I:Cu^{II}$ molar ratio of 1:1 called for by Thomas. In the present process, the $Cu^I:Cu^{II}$ ratio as well as the addition of definable quantites of complex forming alkali- or alkaline earth chlorides is different whereby the contact performance as well as the composition of the end product are influenced.

There is mentioned incidentally on page 2, line 20, of Thomas that for improvement of solubility, ammonium, sodium or potassium chloride have to be added to the contact solution; but Thomas did not recognize that through addition of alkaline earth or other alkali chlorides, especially $CaCl_2$ or $LiCl$, in a quantity which is the same or larger than the total copper concentration, the contact capacity is improved considerably.

Thomas et al. use as starting product a mixture of acetylene-ethylene from which they convert the acetylene exclusively to 1,2-dichloroethylene.

Compared thereto and according to the present invention, acetylene, monovinyl acetylene, phenyl acetylene, and all aliphatic hydrocarbons which have at least a triple bond, can commonly be converted to 1,2-dihalogen ethylene or the corresponding derivative compounds.

Jacobowsky (2,915,565) has as its goal exclusively the yield of 1,1-dichloroethylene (vinylidene chloride) starting from acetylene and hydrogen chloride, whereby 1,2-dichloroethylene accumulates in more or less large quantities.

The present process is limited to the use of a hydrohalic-concentration of 0.1 to below 0.58 mol per liter of the contact solution. With this limitation, applicants have overcome a prejudice as set forth in column 1, line 70, to column 2, line 9, of Jacobowsky which states that: "The contact composition may be varied within wide limits. The concentration of hydrochloric acid in the contact solution which should amount to 2–10% (0.58–2.9 mols per liter), preferably to 3.8–4.5% (1.1–1.3 mols per liter), is essential for its action. If the concentration of hydrochloric acid exceeds this optimum, the percentage of 1,1-dichloroethylene decreases in favor of the content of trans-1,2-dichloroethylene, while, when lower concentrations of hydrochloric acid are present there is a tendency towards the separation of a black percipitate which contains bivalent copper and is insoluble in dilute hydrochloric acid."

By comparing Examples 1–5 of the present application it will be understood that it was necessary to overcome a prejudice, in order to prepare pure trans-1,2-dihalide-ethylene with HCl-concentrations below the mentioned range of 0.58 mol hydrogen halide per liter. The preferred concentration for the present process is 0.3 mol hydrogen halide per liter contact solution.

In summary it can be said that the difference between the present invention and that of the Patent 2,915,565 is as follows: The latter describes the preparation of 1,1-dihalide-ethylenes (vinylidene halides), whereby in the contact solution the $Cu^I:Cu^{II}$ ratio is 4:1 to 9:1, and the hydrogen halide concentration between 0.58 and 2.9 and preferably 1.1–1.3 mols per liter of solution. Contrary to this, the object of the present invention is a process for the preparation of pure trans-1.2.-dihalide ethylene by working with contact solutions in which the ratio of $Cu^I:Cu^{II}$ salts can vary between 9:1 to 23:1. Their hydrogen halide concentration is between 0.1 to below .58 mol per liter.

The activity of the catalyst depends essentially on the $Cu^I_2Cl_2$-concentration and the molar ratio of $Cu^I:Cu^{II}$. Catalyst solutions which besides copper chlorides contain only hydrochloric acid in the proposed concentration of 5.6 to 6.0 mols per liter, must be saturated with $Cu^I_2Cl_2$ in order to have an appropriate activity at the reaction temperature. In view of the fact that $Cu^I_2Cl_2$ is steadily formed during the reaction, cuprous chloride or complex cuprous compounds are very liable to separate.

The solubility of $Cu^I_2Cl_2$ in hydrochloric acid is considerably improved by the addition of, for example, $CaCl_2$ as results from the following table.

SOLUBILITY of $Cu^I_2Cl_2$ AT ROOM TEMPERATURE

| HCl, mols/liter | CaCl$_2$, mols/liter | Cu$^I_2$Cl$_2$, mols/liter |
|---|---|---|
| 1.36 | | 0.11 |
| 3.87 | | 0.76 |
| 5.02 | | 1.23 |
| 6.3 | | 1.89 |
| 0.95 | 1.91 | 1.18 |
| 0.91 | 2.87 | 2.30 |
| 0.85 | 3.68 | 3.05 |
| 1.33 | 3.66 | 3.28 |
| 1.79 | 3.65 | 3.49 |
| 0.83 | 4.54 | 3.64 |

The above table shows that the separation of $Cu^I_2Cl_2$ and complex $Cu^I$-compounds can be avoided by adding about 2 to 3 mols of $CaCl_2$ to a catalyst composed as described above. Moreover, the addition of a greater amount of $CaCl_2$ enables catalyst solutions to be prepared which contain $Cu^I$ in a concentration considerably higher than hitherto possible and which, accordingly, have a considerably improved activity. Example 1, hereinafter, describes the composition of a catalyst yielding 190 grams of trans-1,2-dichloroethylene per liter of catalyst solution an hour. This corresponds to a catalyst activity increased by about 85% as compared with the best results hitherto obtained.

The pertinent literature indicates that the maximum catalyst activity for 1,2-dichloroethylene (102–115 grams per liter of catalyst solution an hour) is obtained when the molar ratio of $Cu^I:Cu^{II}$ is between 4:1 and 9:1. This relatively narrow limitation need not be observed when the catalyst solution is admixed with certain, readily water-soluble salts which are capable of forming complex compounds with $Cu^I_2Cl_2$, for example, salts of alkaline metals or alkaline earth metals. Catalyst solutions which have been prepared on the basis of $CaCl_2$ give the best results. The accompanying examples describe catalyst compositions containing $Cu^I$ and $Cu^{II}$ in a molar ratio above 9:1 to about 23:1 which give good yields of trans-1,2-dichloroethylene per liter of catalyst solution an hour. Only when $Cu^I$ and $Cu^{II}$ are used in still greater molar ratio, for instance, in a ratio over 23:1 is a substantial decrease in the catalyst activity observed. The extension of the molar ratio of $Cu^I:Cu^{II}$ at a maximum catalyst activity from formerly 4:1 to 9:1 to above 9:1 to about 23:1 simplifies the reaction and the technical performance of the process.

It was very surprising to see that trans-1,2-dichloroethylene prepared with the aid of a $CaCl_2$-containing catalyst is free from the impurities referred to in the known process. This result constitutes a considerable improvement of the process which now enables, for example, very pure trans-1,2-dichloroethylene to be produced with a very active catalyst.

$Cu^I_2Cl_2/Cu^{II}Cl_2$-solutions in hydrochloric acid which contain, for example LiCl as the complex forming agent, also yield pure trans-1,2-dichloroethylene. Contrary thereto, impure 1,2-dichloroethylene is always formed when the catalyst solution has been prepared with a complex forming agent other than an alkali metal or alkaline earth metal halide, for example with $NH_4Cl$ as described. In the case where the solution used has not been saturated with hydrogen chloride, the reaction yields finally considerable amount of undesired 1,1-dichloroethylene in addition to 1,2-dichloroethylene.

In accordance with the process of this invention, trans-1,2-dihalogenoethylenes are prepared as follows: acetylene or another aliphatic or aliphatic-aromatic hydrocarbon having at least one triple bond is passed while heated and under superatmospheric pressure through an aqueous catalyst solution of cuprous halide, cupric halide and a halide of an alkali metal or alkaline earth metal in hydrohalic acid. The ratio of the catalyst solution of monovalent to bivalent copper is maintained at between above 9:1 to about 23:1. The catalyst solutions employed contain hydrogen halide in a concentration of about 0.1 to below 0.58 mol per liter of solution.

To produce a catalyst of outstanding activity, the catalyst solution must contain $Cu^I$ and, accordingly, the salts added as the agents forming complex compounds in a high concentration which implies, of course, a strong decrease of the concentration at which the solution is saturated with hydrogen halide.

The process of the invention is carried out at a temperature between about 60° and 120° C., advantageously between 70° C. and 90° C. and under a pressure of between about 1.1 and about 3 atmospheres absolute, preferably between about 1.2 and 1.8 atmospheres absolute.

The ratio of monovalent to bivalent copper in the catalyst solution is maintained, as has already been set forth above, at between above 9:1 to about 23:1 while the total copper concentration in the solution is kept between about 2.0 mols and about 4.0 mols per liter of solution.

The alkali metal or alkaline earth metal halide is advantageously added in a concentration equal to or higher than the total concentration of copper salt.

As alkali metal halide, it is preferred to use the lithium halide and as alkaline earth metal halide it is advantageously to sue the calcium halide, which latter compound gives the best results.

In accordance with this invention trans-1,2-dichloroethylene is prepared with the use of cuprous chloride, cupric chloride and lithium chloride, or calcium chloride, hydrochloric acid and acetylene. Accordingly, cuprous bromide and cupric bromide as well as calcium bromide, hydrobromic acid and acetylene are used for making 1,2-dibromoethylene, and cuprous chloride and cupric chloride as well as calcium chloride, hydrochloric acid and monovinylacetylene are used for making 1,2-dichlorobutadiene, for example.

The apparatus used for carrying out the process of the invention continuously comprises a reduction stage and an oxidation stage. In the reduction stage, the acetylene is reacted with the copper chlorides, while the oxidation stage serves to regenerate the catalyst enriched with $Cu^I_2Cl_2$. Both stages of the apparatus are connected with one another by a catalyst cycle. The reduction stage and the oxidation stage each consist substantially of a reaction tower capable of being heated (capacity: about 3 liters).

In the reduction stage, the acetylene is conducted in a cycle. The acetylene leaving the catalyst contains practically the total reaction product which is subsequently removed by condensation in a cooling system connected in series with the apparatus. The residual gas is replenished with fresh acetylene as the acetylene previously introduced undergoes reaction and is caused to flow back into the reduction tower to travel through the catalyst.

The catalyst solution enriched with $Cu^I_2Cl_2$ flows from the reduction tower first into a system heated to 110° C., in which the residual portions of the reaction product and dissolved acetylene and water in excess are removed from the catalyst solution which is then conveyed to the oxidation tower. After the addition of a corresponding amount of hydrochloric acid, the molar ratio of $Cu^I:Cu^{II}$ in the catalyst solution is adjusted in the oxidation tower to the degree desired by introducing air or oxygen into the catalyst solution. The regenerated catalyst solution is then returned to the reduction tower in a cycle.

The following examples serve to illustrate the invention, but they are not intended to limit it thereto:

*Example 1*

1188 grams of $Cu^I{}_2Cl_2$, 204 grams of $Cu^{II}Cl_2.2H_2O$ and 1776 grams of $CaCl_2$ were dissolved in dilute hydrochloric acid containing 0.3 mol of HCl per liter to obtain 4 liters of solution.

1.8 liters of the catalyst solution so prepared were introduced into the reduction tower, 2.2 liters were introduced into the oxidation tower and the towers were heated to the reaction temperature of 90° C. Under an excess pressure of 220 mm. of mercury, about 80 liters of acetylene per liter of catalyst solution an hour were passed through the reduction tower while hydrochloric acid and oxygen were so introduced into the oxidation tower so that the oxidized catalyst solution flowing back maintained the following composition of catalyst in the acetylene gas tower, i.e., reduction tower:

|  | Mols/liter |
|---|---|
| $Cu^I$ | 3.0 |
| $Cu^{II}$ | 0.3 |
| $CaCl_2$ | 4.0 |
| HCl | 0.3 |

In other words the ratio of $Cu^I:Cu^{II}$ was maintained at 10:1. At these concentrations, the catalyst could be well handled during the entire reaction and did not involve difficulties as did formerly occur, for example by the formulation of salt-like precipitates.

The reaction was arrested after 14 hours. A total yield of 4975 grams of reaction products was obtained; they were completely free from annoying impurities as could be ascertained by an olfactory test and by shaking with an Ilosvay-solution with a pH of 6.8.

The analysis of the crude product by fractional distillation indicated 95% by volume of trans-1,2-dichloroethylene, 4% by volume of 1,1-dichloroethylene and 1% by volume of vinyl chloride. The crude product was distilled once and yielded very pure trans-1,2-dichloroethylene.

The trans-1,2-dichloroethylene was obtained in a total yield of 4775 grams. In view of the fact that the catalyst volume in the reduction tower had been adjusted to 1.8 liters during the entire reaction, the catalyst yielded 190 grams of 1,2-dichloroethylene per liter of catalyst per hour.

*Example 2*

1287 grams of $Cu^I{}_2Cl_2$, 170 grams of $Cu^{II}Cl_2.2H_2O$ and 1776 grams $CaCl_2$ were dissolved in dilute hydrochloric acid containing 0.3 mol of HCl per liter to produce a solution of 4 liters. 1.8 liters of the catalyst solution so produced were introduced into the reduction tower and 2.2 liters into the oxidation tower and the towers were heated to the reaction temperature of 80° C. In the reduction tower about 60 liters of acetylene per liter of catalyst solution an hour were passed under an excess pressure of 220 mm. of mercury through the catalyst which was composed as follows:

|  | Mols/liter |
|---|---|
| $Cu^I$ | 3.25 |
| $Cu^{II}$ | 0.25 |
| HCl | 0.3 |
| $CaCl_2$ | 4.0 |

$Cu^I$ and $Cu^{II}$ were used in a molar ratio of 13:1 which was maintained during the entire reaction. The other reaction conditions were the same as described in Example 1.

After 10 hours, the reaction was arrested and the reaction product obtained, a total of 3020 grams was achieved. The analysis of the product by fractional distillation indicated 97% by volume of trans-1,2-dichloroethylene, about 2% by volume of 1,1-dichloroethylene and about 1% by volume of vinyl chloride. The catalyst yielded accordingly 161 grams of trans-1,2-dichloroethylene per liter of catalyst per hour.

*Example 3*

The apparatus was charged with a catalyst solution composed as follows:

| | | |
|---|---|---|
| $Cu^I{}_2Cl$ | grams | 1346 |
| $Cu^{II}Cl_2.2H_2O$ | do | 136 |
| $CaCl_2$ | do | 2000 |
| HCl | do | 44 |
| Volume | liters | 4 |

In the reduction tower about 85 liters of acetylene were passed per liter of catalyst solution per hour through the catalyst solution at 70° C.; the following concentrations were adjusted in the catalyst and maintained during the entire reaction:

|  | Mols/liter |
|---|---|
| $Cu^I$ | 3.4 |
| $Cu^{II}$ | 0.2 |
| $CaCl_2$ | 4.5 |
| HCl | 0.3 |

Accordingly, the ratio of $Cu^I:Cu^{II}$ was maintained at 17:1. The other conditions were the same as described in Example 1.

The reaction was interrupted after 5 hours. The reaction product obtained, a total of 1585 grams, was free from annoying impurities and consisted of 95% by volume of trans-1,2-dichloroethylene and 5% by volume of 1,1-dichloroethylene. The crude product was distilled once and yielded pure trans-1,2-dichloroethylene.

The catalyst yielded 167 grams of trans-1,2-dichloroethylene per liter of catalyst an hour.

*Example 4*

The apparatus was charged with the following catalyst:

| | |
|---|---|
| $Cu^I{}_2Cl_2$ | 1489 grams=3.76 mols/liter. |
| $Cu^{II}Cl_2.2H_2O$ | 109 grams=0.16 mol/liter. |
| $CaCl_2$ | 2000 grams=4.5 mols/liter. |
| HCl | 44 grams=0.3 mol/liter. |
| Volume | 4 liters. |

In the reduction tower about 60 liters of acetylene per liter of catalyst solution an hour were passed through the catalyst solution under an excess pressure of 230 mm. of mercury, while the molar ratio of $Cu^I:Cu^{II}$ was maintained at 23:1. The other reaction conditions were the same as described in Example 1.

The reaction was terminated after 5 hours. The reaction product obtained, a total of 1049 grams, was free from the impurity described in Example 2 and contained 96% by volume of trans-1,2-dichloroethylene, 3% by volume of 1,1-dichloroethylene and 1% by volume of vinyl chloride. The crude product was distilled once and yielded pure trans-1,2-dichloroethylene. The catalyst yielded 112 grams of trans-1,2-dichloroethylene per liter of catalyst an hour.

*Example 5*

The apparatus was charged with a catalyst solution composed as follows:

| | |
|---|---|
| $Cu^I{}_2Cl_2$ | 1385 grams=3.5 mols/liter. |
| $Cu^{II}Cl_2.2H_2O$ | 205 grams=0.3 mol/liter. |
| $CaCl_2$ | 1775 grams=4.0 mols/liter. |
| HCl | 37 grams=0.25 mol/liter. |
| Volume | 4 liters. |
| $CaCl_2$ | |

About 90 liters of monovinyl acetylene per liter of catalyst solution an hour were passed through the catalyst solution in the reduction tower at a temperature of 85° C. and under an excess pressure of 220 mm. of mercury, while the molar ratio of Cu$^I$:Cu$^{II}$ was maintained at 12:1.

The other reaction conditions were the same as those described in Example 1.

The reaction was terminated after 5 hours and the reaction product obtained was worked up by distillation in vacuo. A total of 818 grams of 1,2-dichlorobutadiene was obtained. The catalyst yielded accordingly 91 grams of 1,2-dichlorobutadiene per liter of catalyst an hour.

What is claimed is:

1. In the process for the manufacture of trans-1,2-dihalogenoethylenes, by passing at least one substance selected from the group consisting of acetylene, monovinylacetylene and phenylacetylene through an aqueous catalyst solution of cuprous halide, cupric halide and at least one halide selected from the group consisting of alkali metal halides and alkaline earth metal halides in hydrohalic acid, at a temperature of between about 60° C. and 120° C. and under a pressure of between about 1.1 atmospheres absolute and about 3 atmospheres absolute, the improvement of maintaining the molar ratio of monovalent copper to bivalent copper in the catalyst solution at above 9:1 to about 23:1, and maintaining the hydrohalic acid concentration at 0.1 to 0.3 mol per liter of catalyst solution.

2. The process of claim 1 wherein the reaction is carried out at a temperature between about 70° C. and 90° C.

3. The process of claim 1 wherein the reaction is carried out under a pressure of between about 1.2 atmospheres and 1.8 atmospheres absolute.

4. The process of claim 1 wherein the catalyst solution contains copper salts in a total concentration of between about 2.0 and about 4.0 mols per liter of catalyst solution.

5. The process of claim 1 wherein the halide added which is selected from the group consisting of alkali metal halides and alkaline earth metal halides is used in a concentration corresponding to the total concentration in which the copper salts are used.

6. The process of claim 1 wherein the halide added which is selected from the group consisting of alkali metal halides and alkaline earth metal halides is used in a concentration greater than the total concentration in which the copper salts are used.

7. The process of claim 1 wherein the alkali metal halide used is the lithium halide.

8. The process of claim 1 wherein the alkaline earth metal halide used is the calcium halide.

9. The process of claim 1 which comprises making trans-1,2-dichloroethylene by using cuprous chloride and cupric chloride and at least one substance selected from the group consisting of lithium chloride and calcium chloride, and hydrochloric acid and acetylene.

10. The process of claim 1 which comprises making 1,2-dichlorobutadiene by using cuprous chloride and cupric chloride, and calcium chloride, hydrochloric acid and monovinylacetylene.

11. The process of claim 1 which comprises making 1,2-dibromomethylene by using cuprous bromide and cupric bromide, and calcium bromide, hydrobromic acid and acetylene.

References Cited by the Examiner

UNITED STATES PATENTS 2,809,221 10/57 Thomas et al. _____ 260—654
2,915,565 12/59 Jacobowsky _____ 260—654

FOREIGN PATENTS 1,094,734 12/60 Germany.

LEON ZITVER, *Primary Examiner.*

ALPHONSO D. SULLIVAN, *Examiner.*

UNITED STATES PATENT OFFICE
CERTIFICATE OF CORRECTION

Patent No. 3,184,514

May 18, 1965

Kurt Sennewald et al.

It is hereby certified that error appears in the above numbered patent requiring correction and that the said Letters Patent should read as corrected below.

Column 3, line 1, for ".58" read -- 0.58 --; column 4, line 41, for "sue" read -- use --; column 6, line 73, strike out "CaCl$_2$---------"; column 8, line 23, for "dibromomethylene" read -- dibromoethylene --.

Signed and sealed this 15th day of February 1966.

(SEAL)
Attest:

ERNEST W. SWIDER
Attesting Officer

EDWARD J. BRENNER
Commissioner of Patents